(12) United States Patent
Ballmaier et al.

(10) Patent No.: US 9,060,593 B2
(45) Date of Patent: Jun. 23, 2015

(54) TOOTHBRUSH

(75) Inventors: Kathi Ballmaier, Wehrheim (DE); Sören Wasow, Freigericht (DE); Tilmann Winkler, Kronberg/Taunus (DE)

(73) Assignee: BRAUN GMBH, Kronberg (DE)

( * ) Notice: Subject to any disclaimer, the term of this patent is extended or adjusted under 35 U.S.C. 154(b) by 1141 days.

(21) Appl. No.: 12/595,749

(22) PCT Filed: Apr. 10, 2008

(86) PCT No.: PCT/EP2008/002842
§ 371 (c)(1),
(2), (4) Date: Oct. 13, 2009

(87) PCT Pub. No.: WO2008/125274
PCT Pub. Date: Oct. 23, 2008

(65) Prior Publication Data
US 2010/0058550 A1    Mar. 11, 2010

(30) Foreign Application Priority Data

Apr. 13, 2007    (DE) .................. 10 2007 017 869

(51) Int. Cl.
*A46B 5/02*    (2006.01)
*A46B 9/00*    (2006.01)
*B29C 45/00*    (2006.01)
(Continued)

(52) U.S. Cl.
CPC . *A46B 5/02* (2013.01); *A46B 5/021* (2013.01); *A46B 9/005* (2013.01); *A46B 9/06* (2013.01); *A46B 2200/1066* (2013.01); *B29C 45/0025* (2013.01); *B29C 45/0046* (2013.01); *B29C 45/1676* (2013.01); *B29L 2031/425* (2013.01)

(58) Field of Classification Search
USPC ......... 15/143.1, 167.1; 16/430, 431; 264/243, 264/274, 275, 318
See application file for complete search history.

(56) References Cited

U.S. PATENT DOCUMENTS 7,047,591 B2    5/2006    Hohlbein
7,137,166 B1    11/2006    Kraemer
(Continued)

FOREIGN PATENT DOCUMENTS

WO    WO 01/43582 A1    6/2001
WO    WO 0143582    *    6/2001
WO    WO 2005/122827 A1    12/2005

OTHER PUBLICATIONS

PCT International Search Report dated Dec. 8, 2008.

*Primary Examiner* — Todd Manahan
*Assistant Examiner* — Brianne Kalach
(74) *Attorney, Agent, or Firm* — Vladimir Vitenberg

(57) ABSTRACT

The invention relates to a toothbrush having a head area comprising cleaning elements, a grip area, and a neck area, which connects the head and the grip areas to each other, wherein the toothbrush is configured having a first component made of plastic, and at least one further second component made of plastic, wherein the first component has a relief structure that is covered by the second component. The relief structure comprises high regions having the shortest distance to the outer surface of the second component, and low regions having the greatest distance to the outer surface of the second component, and the relief structure has intermediate regions adjacent to the high and low regions, the distance to the outer surface of the second component of the intermediate regions being between that of the high and low regions.

22 Claims, 6 Drawing Sheets

(51) Int. Cl.
*B29C 45/16* (2006.01)
*A46B 9/06* (2006.01)
*B29L 31/42* (2006.01)

(56) References Cited

U.S. PATENT DOCUMENTS

| | | | |
|---|---|---|---|
| 7,297,303 B2 * | 11/2007 | Kraemer | 264/243 |
| 7,458,125 B2 | 12/2008 | Hohlbein et al. | |
| 7,614,111 B2 | 11/2009 | Moskovich et al. | |
| 2006/0026784 A1 | 2/2006 | Moskovich et al. | |
| 2006/0057087 A1 | 3/2006 | Moskovich et al. | |
| 2006/0195995 A1 | 9/2006 | Moskovich et al. | |
| 2006/0200925 A1 | 9/2006 | Moskovich et al. | |
| 2006/0213018 A1 * | 9/2006 | Gross et al. | 15/143.1 |
| 2009/0025165 A1 | 1/2009 | Moskovich et al. | |
| 2009/0158540 A1 * | 6/2009 | Baertschi et al. | 15/143.1 |
| 2009/0188063 A1 * | 7/2009 | Baertschi et al. | 15/167.1 |

* cited by examiner

TOOTHBRUSH

The present invention relates to a toothbrush with a head area with cleaning elements, a grip area, and a neck area that connects the head area and the grip area to each other, the toothbrush being fashioned with a first component made of plastic and at least one additional second component also made of plastic, the first component having a structure that is covered by the second component.

A toothbrush, the base element of which is formed from two plastic components, is known from U.S. Pat. No. 5,781,958, for example. Here, a hard plastic is provided that extends from a head area via a neck area to a grip area, and that has in a grip area an internal structure around which the second component, made of soft plastic, is injection-molded. While it is true that the soft components in the grip area enable better grip and fit to the hand of the user, soft plastics in general, and in particular those having a surface structure such as grooves, are more difficult to clean and greatly increase the production costs. In addition, the soft plastic contributes almost nothing to the overall strength of the toothbrush body, so that the hard component has to be made very solid.

From EP 1 532 891 A1, a toothbrush of the type named above is known. This toothbrush consists essentially of at least two components: a first hard plastic component that extends from the head area via the neck area to the grip area, and is fashioned in the grip area with skeleton-like extensions, as well as a second soft plastic component that is injection-molded around the hard plastic, thus partly covering the extensions and partly leaving them exposed. In addition, the soft plastic component is provided with an outer structure. The structure of the first component, formed from extensions, is predominantly provided with limiting walls extending radially outward relative to a longitudinal axis of the toothbrush. Therefore, the steep limiting walls of the extensions act as flow-inhibiting obstacles for the second soft components that are to be injected, if, in the absence of other countermeasures, formation of bubbles in the region of the toothbrush more distant from the injection point is to be avoided. In addition, the structure of the extensions requires corresponding compromises or adaptations to the physical properties of the second component and to the technical injection-molding parameters, such as, for example, the injection pressure, so that the second component reaches all the segments that are to be enclosed as uniformly and error-free as possible, despite the formation of the extensions.

Therefore, an object of the present invention is to provide a toothbrush of the type named above that can be manufactured at a high level of quality, in particular while avoiding the formation of flow marks.

This object is achieved by a toothbrush having the features of Claim 1. Further advantageous features of this toothbrush are described in the features of the subclaims.

Due to the fact that the relief structure has regions of intermediate height adjacent to the high and low regions, whose distance from the outer surface of the second component is between that of the high and low regions, the relief structure is characterized not only by high and low regions, but by a graduated or continuous height profile, so that the relief structure is not formed by steep, vertically protruding extensions, which would have disadvantageous effects on the flow characteristic for the second component that covers the relief structure. The graduated structure, having regions of intermediate height in the relief structure, makes it possible to use a second component having a moderate mold flow index, and to inject the second component into the injection-molding tool with lower dwell pressure, and also to avoid the danger of air enclosures in the second component if, for example, this second component is made of polypropylene, as is the first component. Using a lower dwell pressure for the injection of the second component, and providing the relief structure with regions of intermediate height, which is more conducive overall to the flow, avoids melting on and washing away the first component by the hot second component and the concomitant risk of forming flow marks.

In an advantageous development, the high regions and intermediate regions are fashioned with a planar or smooth terminating surface. This likewise results in a more advantageous flowing of the second component on and along the first component.

In a further advantageous development, the regions of intermediate height are fashioned as segments inclined relative to a horizontal plane along the longitudinal axis of the toothbrush. If the relief structure has, for example, a zigzag structure (viewed in section), so that the region of intermediate height is an inclined plane, the second component, injected over this structure, can have excellent flow along this zigzag structure and can cover and fill this segment without loss of quality. A similar effect can be achieved if the relief structure, seen in a top view, has a floral or other pattern, not having a zigzag structure (in a side view), but also having high, intermediate, and low regions.

In an advantageous development, the shortest distance between the respective high regions of the relief structure and the outer surface of the second component is between 0.4 mm and 1 mm. Because the relief structure is preferably situated only at the upper side in the grip area, i.e. the same side on which the tooth-cleaning elements are situated in the head area, the relevant outer surface corresponds to the upper side of the grip area. This is the side of the grip area on which the thumb support on the grip area is also located. In the case of a zigzag pattern as a relief structure, this means that the edges of the grip area closest to the upper side form the high regions, and these have a spacing of between 0.4 mm and 1 mm. Preferably, the greatest distance from the outer surface of the second component to the low regions is between 3 mm and 6 mm. Again taking a zigzag pattern as an example of a relief structure, this results in the lower edges of the indentation pattern, facing away from the upper side of the grip area, forming the low regions, and these edges are situated at a distance from the surface of 3 mm to 6 mm. Particularly preferably, the shortest distance between the high regions and the outer surface of the second component is between 0.6 mm and 0.9 mm. Particularly preferably, the greatest distance from the outer surface of the second component to the low regions is between 3 mm and 5 mm. It has turned out that in these distance ranges the second component can cover the first component in an optimal manner for a high-quality result, and optimized injection-molding cycle times can be achieved for each component.

In an advantageous development, the injection point for the injection molding of the second component is situated at a rear end area of the grip area, on a side of the grip area facing away from the upper side of the toothbrush in the head area on which the cleaning elements for cleaning the teeth are situated. In addition, the relief structure is fashioned in such a way that the regions of intermediate height, which are closer to the injection point, are situated lower relative to the outer surface or upper side of the second component than are immediately adjacent regions of intermediate height, which are further from the injection point relative to the first-named regions of intermediate height. It has turned out that a more uniform filling of the tool mold for the second component is, conversely, enabled if the regions of intermediate height have, as their distance from the injection point for the second component in the tool increases, a further the distance to the outer surface, or surface at the thumb rest of the toothbrush, the greater the distance to the injection point is. A more complex relief structure to be covered by the second component can, through such a formation (as described below and in the figures), supply a higher-quality covering of the relief structure, for example without formation of flow marks by the second component.

In an advantageous development, the relief structure is situated exclusively on the upper side of the grip area, which corresponds with the side on which the tooth-cleaning elements of the head area are located. As already mentioned above, this upper side also corresponds to the side of the toothbrush on which the thumb support, or thumb rest, is provided. This has the advantage that a toothbrush having a different appearance due to a different relief structure is possible by exchanging just one of at least four tool halves required (for two tools for injection of two components). The tool half that has to be changed for a modified relief structure corresponds to the one that defines the upper side of the first component. With a modified relief structure, all other tool halves can thus remain unmodified. In the case of particularly long-lived tools, it is even possible to bring about a change of the relief structure and thus a change in the appearance of the toothbrush merely by exchanging an insert tool into the area of the relief structure in the upper tool half for the first component that defines the relief structure. Furthermore, it is important that the relief structure is on the upper side of the toothbrush, and the point of injection is on the underside of the toothbrush relative thereto. Thus, the relief structure, similar to the openings for the bristle bunches of the tooth-cleaning elements, is situated on the same tool ejection side of the first component.

In an advantageous development, the edges of the relief structure are rounded with a radius of >0.15 mm, in particular >0.2 mm. It has turned out that this results in a superior maintenance of quality of the relief structure even if a second component is injected over this structure so as to cover it.

In another advantageous embodiment of the toothbrush, the first component is fashioned from hard plastic, in particular polypropylene, and the second component is also of hard plastic, in particular also polypropylene. A two-component toothbrush having two hard plastic components at first presents a further problem, in particular if both these components are made of polypropylene, because standardly the two-component manufacture in which each component is made of polypropylene results in a less optimal adhesive joining of the two components, and the problems of quality, in particular formation of flow marks during the injection of the second component, are increased by this combination of materials. However, the measures described above and below are intended to counteract this. However, from a hygienic point of view the forming the overall toothbrush surface from hard plastic alone, in particular using polypropylene, is to be preferred. Considerations of cost and the feasibility of the relief structure are also advantages that go along with this combination of two hard materials.

An adhesion-improving effect can be achieved if one of the two components is fashioned not from a hard plastic, but rather from an elastomer, in particular a thermoplastic elastomer. In order to take advantage of the characteristics of the combination of two hard materials while nonetheless improving the bonding properties of the two components, it is advantageous to admix a thermoplastic elastomer or some other elastomer into the first or second component, in a maximum proportion of 15 or 20% by weight. As a minimum admixture, 5% is designated.

In a further advantageous embodiment of the toothbrush, colorant components are admixed into the two components in proportions of 0.5% to 6%, in particular 1% to 5%, more particularly 1.5% to 4%, by weight in each case. This qualitatively improves the appearance of the overall toothbrush, in particular with a relief structure.

In a further development of the toothbrush, the regions of intermediate height have a surface of >1 mm$^2$, in particular >3 mm$^2$ Given a relief structure fashioned as a zigzag pattern (in longitudinal section), as shown as an example below, the inclined oblique surfaces, as regions of intermediate height, are approximately 3 mm$^2$ to 3 cm$^2$. This planar formation of the areas of intermediate height likewise enables a second component to advantageously flow along during the injection into the tool mold.

Preferably, the regions of intermediate height enclose a positive or negative angle of 0° to 75°, in particular of from 0° to 60°, along the longitudinal axis of the toothbrush, relative to a planar horizontal surface. For the zigzag pattern of the relief structure, chosen as an example, this means an angle of inclination of the oblique surfaces of less than 75°, in particular less than 60°, preferably less than 50°. In this way, it is ensured that no steep walls in the relief structure form obstacles opposing the direction of flow of the second component. The relief structure is thus advantageously provided either with oblique surfaces instead of perpendicular or nearly perpendicular surfaces (radial to the longitudinal axis), or with steps (which then form the regions of intermediate height) that do not exceed a maximum height (preferably less than 3 mm or 1 mm). Larger steps/maximum heights with oblique surfaces or other intermediate levels that precede the second component in the direction of flow (starting from the injection point in the tool) are not critical either, as long as the surfaces directly impacted by the flow are small (e.g. smaller than 8 mm$^2$ or smaller than 6 mm$^2$) (see above for maximum heights). In this way, the first component is barely partially melted by the second component, and a high-quality appearance of the relief structure results.

In a further advantageous embodiment of the toothbrush, a proportion of 20% to 80% by weight of the first component and of 80% to 20% by weight of the second component are designated for the grip area.

In a development of the toothbrush, the first component is bonded to the second component by mechanical means. This is relevant in particular if, according to a preferred specific embodiment, the toothbrush is manufactured exclusively from two hard plastics, such as polypropylene for both components (without elastomer portions), because two such components inherently bond poorly. The mechanical bonding is produced by undercuts and openings made in the first component, around and through which the second component flows, so that a mechanically solid bond is formed between the two components.

Further aims, features, and advantageous possible uses of the present invention result from the following description of exemplary embodiments on the basis of the drawings. Here, all of the described and/or graphically represented features, considered alone or in any rational combination, form the subject matter of the present invention, independent of the claims or dependencies related to them.

Figure 1:
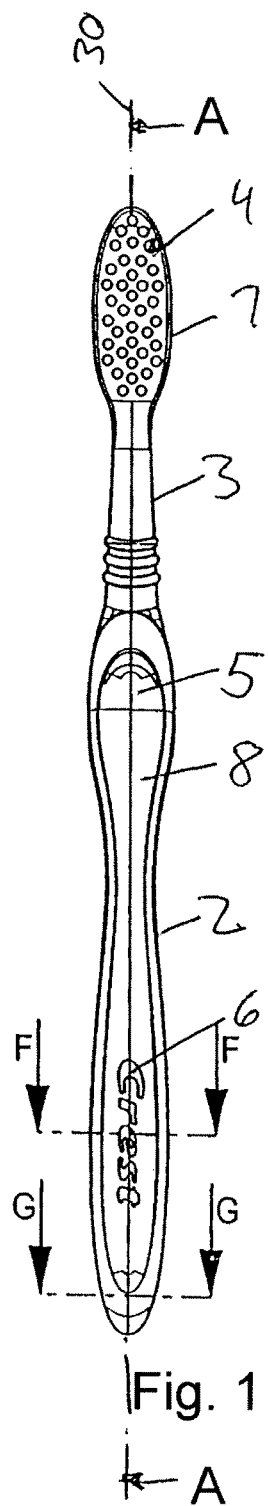
FIG. 1 shows a top view of the upper side of the grip area and of the toothbrush according to the present invention.
Figure 5:
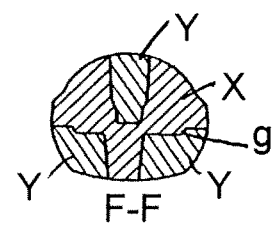
Figure 6:
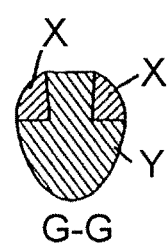
Figure 2:
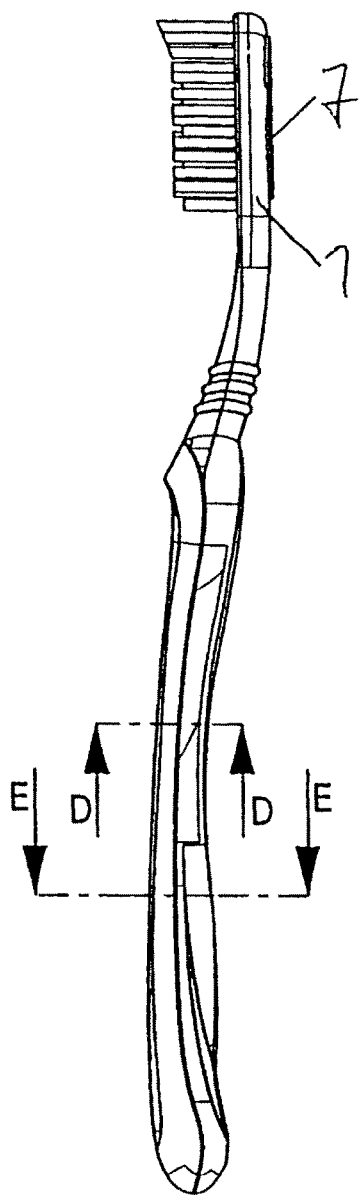
FIG. 2 shows a side view of the toothbrush according to FIG. 1.
Figure 3:
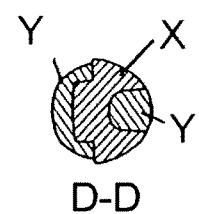
Figure 4:
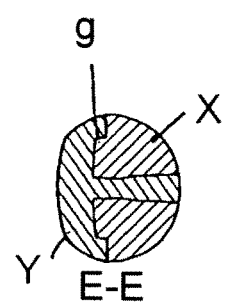
Figure 8:
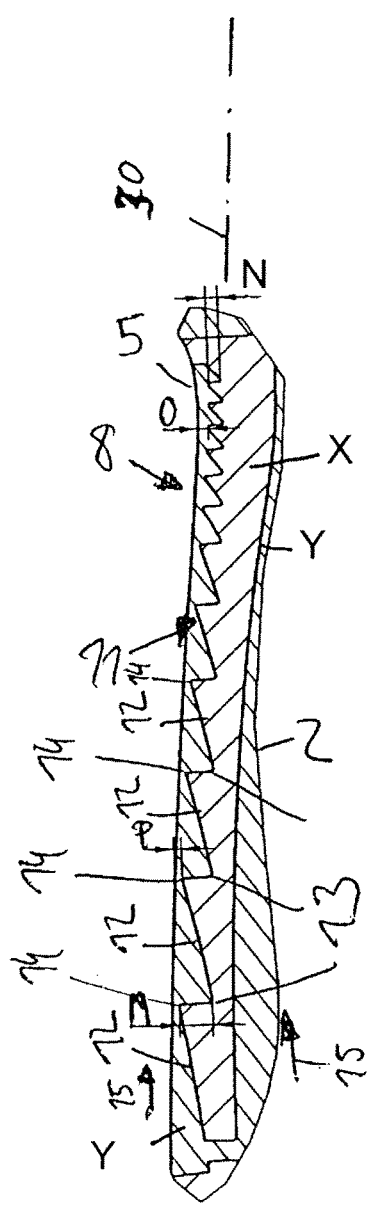
Figure 7:
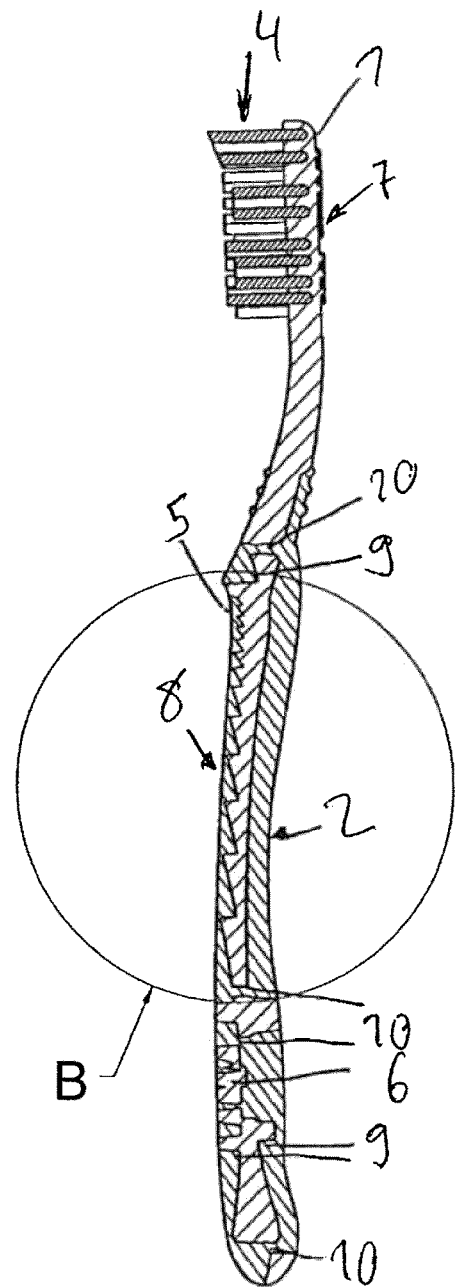
Figures 9, 10:
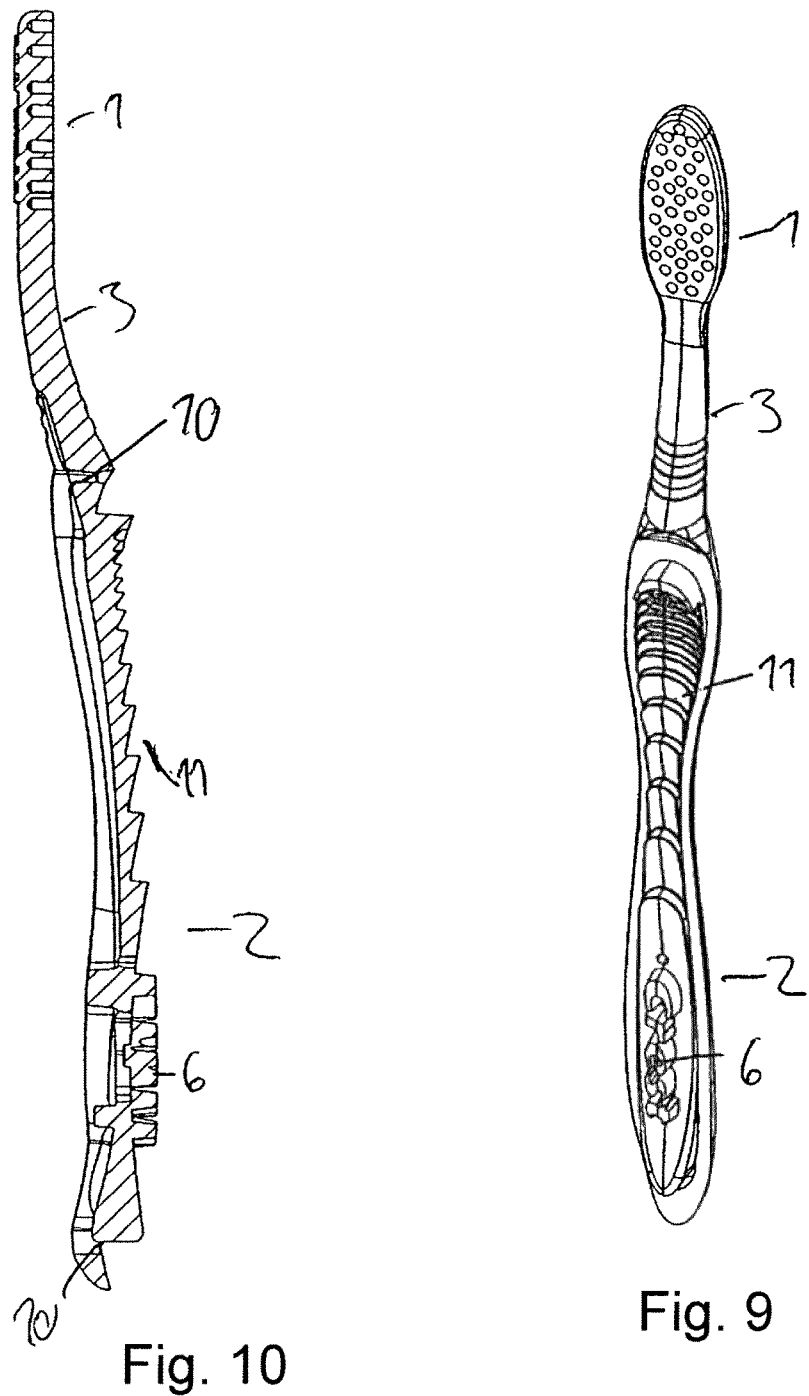
Figure 12:
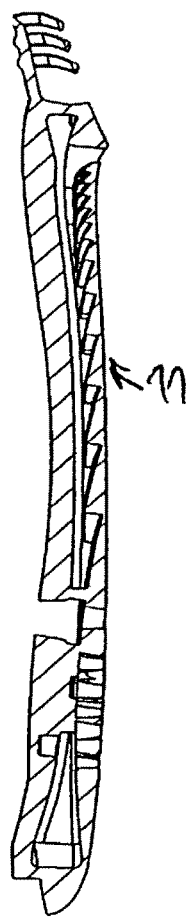
Figure 11:
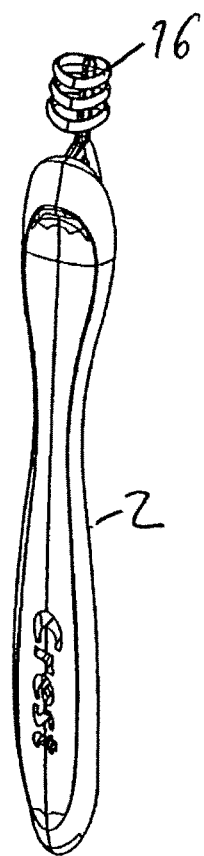
Figure 13:
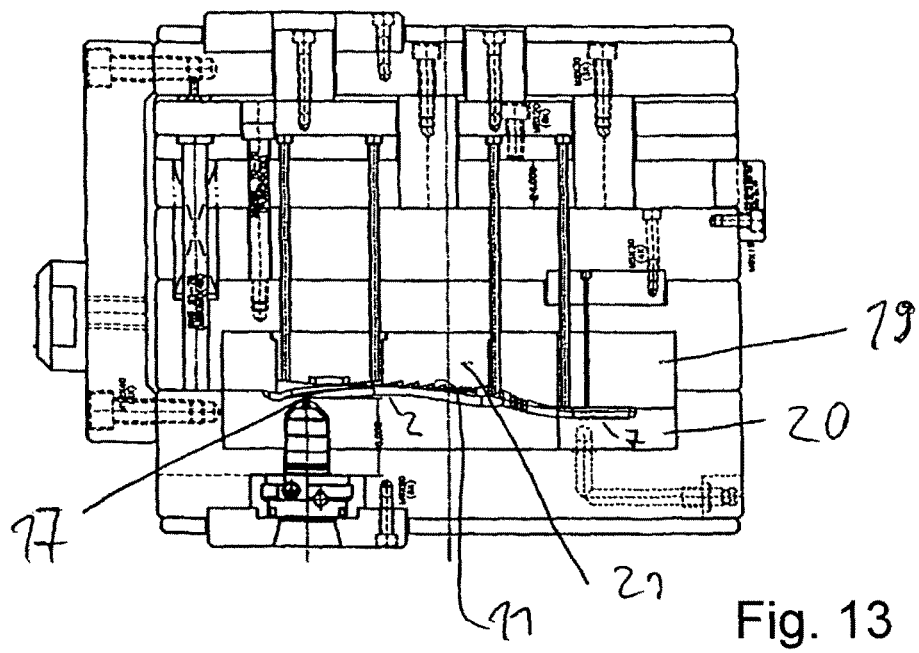
Figure 14:
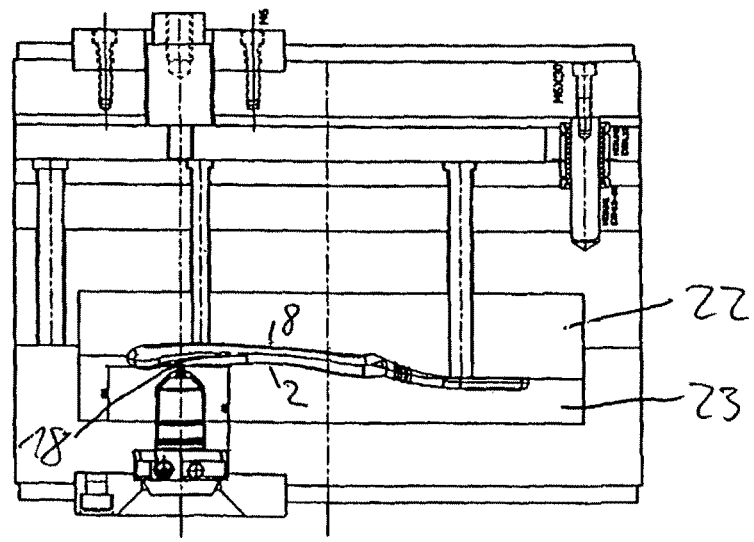

FIG. 3 shows a cross-sectional view through the toothbrush along the section D-D in FIG. 2, FIG. 4 shows a cross-sectional view through the toothbrush along the line E-E in FIG. 2, FIG. 5 shows a cross-sectional view through the toothbrush along the line F-F in FIG. 1, FIG. 6 shows a cross-sectional view through the toothbrush along the line G-G in FIG. 1, FIG. 7 shows a longitudinal center section view along the line A-A in FIG. 1, FIG. 8 shows an enlarged view of the region marked B in FIG. 7 of the sectional view in FIG. 7, FIG. 9 shows a perspective view of the first component of the toothbrush according to FIG. 1, FIG. 10 shows a longitudinal center section through the first component of the toothbrush according to FIG. 9, FIG. 11 shows a perspective view of the second component of the toothbrush according to FIG. 1, FIG. 12 shows a longitudinal center section through the second component of the toothbrush according to FIG. 11, FIG. 13 shows a schematic side view of a tool for injecting the first component of the toothbrush according to FIG. 1, and FIG. 14 shows a schematic side view of the tool for injecting the second component of the toothbrush according to FIG. 1.

FIG. 1 shows a top view of the toothbrush, having a head area 1, a grip area 2, and a neck area 3 that connects the head and grip areas. On the tooth-cleaning side of head area 1 are situated cleaning elements 4 such as a field of bristles made up of a large number of bundles of bristles or soft elastomer cleaning elements or a combination of the two. Upper side 8 of grip area 2 is provided with a thumb rest 5 at the end segment of the grip area facing the neck area, and is provided at the other end area of the upper side with a trademark logo 6 that is not printed but rather is produced by the first component in the injection molding method. The outer surface of the toothbrush is preferably predominantly smooth (i.e., does not have a fine grip structuring), and in particular is smooth on the upper side above the relief structure.

FIG. 2 shows a side view of the toothbrush, projections being fashioned on the rear side of head area 1 that provide a tongue scraper 7 as an additional cleaning element for oral hygiene. In the sectional views through grip area 2 shown in FIGS. 3 through 6, the two components in which the toothbrush was injected are distinguished from each other by hatching in opposite directions. The first component is designated as X and the second component is designated as Y. As can be seen from the sectional representations of FIGS. 3 through 6, and also from the longitudinal section shown in FIG. 7, the two components are mechanically fixed to one another by various geometrical undercuts 9 and openings 10, so that the two components remain solidly bonded even when bending stress is applied on the toothbrush. The undercuts and openings act via various axes of the toothbrushes (via the longitudinal axis and via radial transverse axes), so that the bond is sufficiently solid in all directions.

FIG. 8 shows an enlarged view of the detail circled and labeled B in FIG. 7. Thus, relief structure 11, which is oriented towards upper side 8 in grip area 2, is shown in an enlarged view. Here, the relief structure is fashioned in the form of a cut zigzag pattern. Relative to a horizontal 30 oriented along the longitudinal axis of the toothbrush, the relief structure has inclined, essentially planar surfaces that form regions of intermediate height 12. Regions of intermediate height 12 extend from low regions 13 to high regions 14. In the case of this stepped pattern or zigzag pattern provided as a relief structure, the low and high regions are fashioned as low and high edges. The low regions form low points having a maximum distance, relative to the immediately adjacent region of the relief structure, to the outer surface or the surface of the upper side of the second component. Relative to the immediately adjacent region of the relief structure, the high regions have a shortest distance to this upper side or to the outer surface of the second component. In the present example, in the area of thumb rest 5 at point O this shortest distance is approximately 0.7 mm to 0.8 mm. At point P in FIG. 8, the shortest distance is approximately 0.5 mm to 0.6 mm. In the present relief structure, the indentation depth in the area of the thumb rest at point N is approximately 0.9 mm to 1 mm, and at the other end of the relief structure, at the point M, it is approximately 2.5 mm to 3 mm. For the present relief structure, this results in a distance from the surface of the toothbrush to the low regions of between approximately 1.5 mm to 3 mm or 4 mm. Relative to the direction of flow of the second component in FIG. 8, shown by arrows 15, which in this case also correspond to the direction of flow of the first component, the relief structure is fashioned such that in the area of the relief structure the second component flows around essentially inclined regions of intermediate height that enclose, relative to horizontal 12, approximately an angle of 10° to 60°, or 0° to 70°. Given an opposite orientation of the relief structure, against the direction of flow onto the second component, reduction of quality would have to be accepted with otherwise identical parameters. Thus, the inclined surfaces of regions of intermediate height 12 are inclined in the direction of flow, such that the steps between the high and low regions do not create significant disturbances for the second component because the flow onto the second component meets the inclined surfaces like a ramp. Preferably, a large number of high regions, regions of intermediate height, and low regions are provided in the relief structure, each uninterrupted edge or surface being regarded as a region. The depicted relief structure has for example 13 high regions (including the one at the rear end behind the logo), 14 low regions (each in the form of edges), and 14 regions of intermediate height, each in the form of inclined surface segments). A minimum of two each of the high, low, and intermediate regions, or in particular five, is advantageous. A relief structure is also conceivable having only one region of intermediate height that runs, for example, beginning from the logo, at an angle from a low region up to the thumb rest at a high region, and optionally runs with a mirror-image segment on the other side of the logo on the upper side of the grip area, likewise climbing to the end area at an angle.

Alternatively to the relief structure in the form of a zigzag or stepped pattern shown in the figures, this effect, advantageous in terms of the flow, can also be achieved if the regions of intermediate height do not form inclined surfaces relative to horizontal 30, but rather optionally form surfaces planar or parallel to said horizontal. The adjacent high and low regions are situated through an intermediate plane having a medium distance relative to the high and low regions relative to the outer surface of the upper side of the second component. It has turned out that the orientation and fashioning of the relief structure with regions of intermediate height, advantageous in terms of flow, reduces the resistance to the hot component flowing into the tool mold, so that the first component melts less during the flowing in, and the formation of flow marks and other defects in quality is avoided. Relief structures having a different visual appearance, but having regions of intermediate height, are also suitable for achieving these advantages.

FIGS. 9 and 10 show the part of the toothbrush produced by the first component. The first component is preferably made of polypropylene, in particular white in color, and is thus fashioned from a hard plastic. The head area 1 without tooth-cleaning elements 4, most of neck area 3, and approximately half, or approximately 60%, or a maximum of 70% by weight, of grip area 2 are thus capable of being produced exclusively by the first component. FIG. 9 shows in a perspective view relief structure 11 and all the other parts produced in the first component, the relief structure being shown in perspective as a shingled pattern or a stepped pattern. Because the injection point is situated approximately under logo 6, in the grip area on the underside of the toothbrush, and the injection point for the second component is situated approximately in the same area, the orientation of the relief structure relative to the injection point, avoiding steep walls, at an angle of 80° to 110° against the direction of flow of the second component in the relief structure. As is shown in FIGS. 7, 8, and 10, a majority of the segments of the relief structure 11 terminate with an apex comprising a single high-region edge. As is shown in FIG. 9, the segments and the edges of the relief structure 11 can be convexly curved towards the head area. As best shown in FIG. 8, the high-region continuous edges 14 and the low-region continuous edges 13 of the first component X are fully covered by the second component Y. As best shown in FIG. 9, the high-region continuous edges 14 form lines extending in a direction generally perpendicular to the longitudinal axis, said lines being also convexly curved towards the head area and towards the outer surface of the second component Y.

For purposes of illustration, FIGS. 11 and 12 show the injected part theoretically produced only by the second component (in fact, the second component is injected over the first component). The second component thus forms approximately 40 to 50% by weight of the grip area, and in addition has three annular decorative elements in the transition area between the grip area and neck area 3. In particular in the sectional view according to FIG. 12, it can again be seen how a high-quality relief structure can be produced in the area of relief structure 11 by minimizing the height differences having to be overcome in the direction of flow of the second component. Relief structure 11 is fashioned such that, due to the regions of intermediate height, the material thickness to be filled by the second component remains as low as possible (see the region specifications above), and the preferably discontinuous changes in the material thickness of the relief structure occur in the direction of flow of the second component, from a high region to a low region, and not vice versa.

The second component is preferably manufactured from a hard plastic, preferably polypropylene. A colorant is admixed to this hard plastic in a proportion of approximately 2% to 5% by weight, so that a translucent, or transparent without the colorant, effect results. Alternatively, the second component is made of an elastomer that is correspondingly transparent, or for example is slightly colored as above so as to be translucent.

With regard to their weight portions, the first and the second component are apportioned approximately uniformly in the grip area, so that preferably at least 30% to 40% of the overall weight portions of the toothbrush plastic is formed by the second component. Preferably, only two components are provided for the grip, neck, and head area of the toothbrush (without cleaning elements), so that optimized cycle times are possible for the injection molding. The mold flow index (MFI) for the second component is preferably between 15 and 45, in particular between 15 and 40.

FIG. 13 shows a side view through a tool for the manufacture of the first component by injection molding of the toothbrush using the hot-runner method. Here, injection point 17 is situated in the rear part of the grip area on the back side of the toothbrush. The injection molding tool has an upper half 19 and a lower half 20, the ejection side corresponding to upper half 19 and relief structure 11 advantageously being situated at the ejection side of the tool. Upper tool half 19 advantageously has an insert tool part 21 that defines the pattern of the relief structure. Through simple exchanging of insert part 21 or of upper tool half 19, the part having the relief structure, which defines the style of the toothbrush as a whole, can easily be modified by modified insert tools 21 or upper tool halves 19.

FIG. 14 shows the completion of the toothbrush with two additional (upper 22 and lower 23) tool halves for the completion of the toothbrush with the second component via injection point 18 in the rear lower grip area, also preferably using the hot-runner method. After injection of the first component in the tool according to FIG. 13, the injected part with the first component is placed into the tool according to FIG. 14 and the second component is injected over it. If the head area has not already been provided with cleaning elements during the injection process, this takes place subsequently using known methods.

What is claimed is:

1. A toothbrush having a head area that has cleaning elements disposed on an upper side of the toothbrush, a grip area, a neck area that connects the head and grip areas to one another along a longitudinal axis of the toothbrush, the toothbrush further having an injection point, wherein the toothbrush comprises a first component made of plastic and at least a second component made of plastic, the grip area having an outer surface formed by the second component, wherein the first component has a relief structure covered by the second component, wherein the relief structure has high regions, wherein a majority of said high regions terminate with an apex comprising a single high-region continuous edge fully covered by the second component and spaced by the shortest distance from the outer surface of the second component, wherein the relief structure has low regions, formed by low-region continuous edges fully covered by the second component and spaced by the greatest distance from the outer surface of the second component, wherein the relief structure has regions of intermediate height adjacent to the high and low regions, whose distance to the outer surface of the second component is between that of the high and low regions, and wherein at least some of the high-region continuous edges form lines that in plain view extend in a direction generally perpendicular to the longitudinal axis and that are convexly curved towards the head area and towards the outer surface of the second component.

2. The toothbrush according to claim 1, wherein the high and intermediate regions are fashioned with a planar terminating surface.

3. The toothbrush according to claim 1, wherein the regions of intermediate height are fashioned as segments that are inclined relative to a horizontal plane along the longitudinal axis of the toothbrush.

4. The toothbrush according to claim 3, wherein the shortest distance between the high regions and the outer surface of the second component is between 0.4 mm and 1 mm.

5. The toothbrush according to claim 1, wherein the greatest distance from the outer surface of the second component to the low regions is between 3 mm and 6 mm.

6. The toothbrush according to claim 1, wherein the injection point for the second component is situated in a rear end area of the grip area, on a side opposite to the upper.

7. The toothbrush according to claim 1, wherein the relief structure is situated exclusively on the upper side.

8. The toothbrush according to claim 1, wherein the high-region edges are rounded with a radius of >0.2 mm.

9. The toothbrush according to claim 1, wherein the first component is formed from hard plastic.

10. The toothbrush according to claim 9, wherein the first component is fashioned from polypropylene.

11. The toothbrush according to claim 1, wherein the second component is fashioned from hard plastic.

12. The toothbrush according to claim 11, wherein the second component is fashioned from polypropylene.

13. The toothbrush according to claim 1, wherein at least one of the first component and the second component contains up to 20% by weight of an elastomer.

14. The toothbrush according to claim 1, wherein colorant components are admixed to the second component in a proportion of 0.5% to 6% by weight.

15. The toothbrush according to claim 14, wherein the colorant components are admixed to the second component in a proportion of 1.5% to 4% by weight.

16. The toothbrush according to claim 1, wherein the regions of intermediate height have a surface of >1 mm$^2$.

17. The toothbrush according to claim 1, wherein the regions of intermediate height enclose a positive or negative angle of 0° to 60°, relative to a planar horizontal surface along the longitudinal axis of the toothbrush.

18. The toothbrush according to claim 1, wherein the grip area comprises from 20% to 80% of the first component.

19. The toothbrush according to claim 1, wherein one of the first component and the second component has at least one undercut and the other of the first component and the second component has at least one opening, said at least one undercut and said at least one opening being structured and configured to bond the first component to the second component by mechanical means.

20. The toothbrush according to claim 1, wherein the relief structure extends onto or is provided on a side of the toothbrush that differs from a side on which the injection point is situated.

21. The toothbrush according to claim 1, wherein the relief structure is situated on the upper side of the toothbrush.

22. The toothbrush according to claim 1, wherein the relief structure and the injection point are situated on mutually opposite sides.

* * * * *